United States Patent
Zeng et al.

(10) Patent No.: US 8,775,064 B2
(45) Date of Patent: Jul. 8, 2014

(54) SENSOR ALIGNMENT PROCESS AND TOOLS FOR ACTIVE SAFETY VEHICLE APPLICATIONS

(75) Inventors: Shuqing Zeng, Sterling Heights, MI (US); James N. Nickolaou, Clarkston, MI (US); David A. Osinski, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 256 days.

(21) Appl. No.: 13/104,704

(22) Filed: May 10, 2011

(65) Prior Publication Data

US 2012/0290169 A1    Nov. 15, 2012

(51) Int. Cl.
*G06F 7/00* (2006.01)
*G06F 17/10* (2006.01)
*G01M 11/00* (2006.01)

(52) U.S. Cl.
USPC ............. 701/301; 701/1; 701/29.7; 701/30.1; 702/94

(58) Field of Classification Search
CPC .................................. G06F 7/00; G06F 17/10
USPC .................................. 701/1, 29, 301; 702/94
See application file for complete search history.

(56) References Cited

U.S. PATENT DOCUMENTS

| | | | | |
|---|---|---|---|---|
| 6,505,105 B2* | 1/2003 | Hay et al. | ...................... | 701/33.1 |
| 6,594,600 B1* | 7/2003 | Arnoul et al. | .................... | 702/94 |
| 6,694,277 B2* | 2/2004 | Schneider et al. | ............ | 702/104 |
| 6,919,917 B1* | 7/2005 | Janssen | .......................... | 348/143 |
| 7,424,387 B1* | 9/2008 | Gill et al. | ...................... | 702/150 |
| 7,460,951 B2* | 12/2008 | Altan et al. | .................... | 701/536 |
| 7,681,448 B1* | 3/2010 | Preston et al. | ............... | 73/432.1 |
| 2008/0201033 A1* | 8/2008 | DeMersseman et al. | ........ | 701/29 |
| 2008/0300787 A1* | 12/2008 | Zeng | ............................. | 701/301 |
| 2008/0306666 A1* | 12/2008 | Zeng et al. | ....................... | 701/70 |
| 2010/0076709 A1* | 3/2010 | Hukkeri et al. | ................. | 702/94 |
| 2010/0198513 A1* | 8/2010 | Zeng et al. | ..................... | 701/300 |

* cited by examiner

*Primary Examiner* — Fadey Jabr
*Assistant Examiner* — Martin Weeks
(74) *Attorney, Agent, or Firm* — John A. Miller; Miller IP Group, PLC (57) ABSTRACT

A method and tools for virtually aligning object detection sensors on a vehicle without having to physically adjust the sensors. A sensor misalignment condition is detected during normal driving of a host vehicle by comparing different sensor readings to each other. At a vehicle service facility, the host vehicle is placed in an alignment target fixture, and alignment of all object detection sensors is compared to ground truth to determine alignment calibration parameters. Alignment calibration can be further refined by driving the host vehicle in a controlled environment following a leading vehicle. Final alignment calibration parameters are authorized and stored in system memory, and applications which use object detection data henceforth adjust the sensor readings according to the calibration parameters.

16 Claims, 5 Drawing Sheets

SENSOR ALIGNMENT PROCESS AND TOOLS FOR ACTIVE SAFETY VEHICLE APPLICATIONS

BACKGROUND OF THE INVENTION

1. Field of the Invention

This invention relates generally to object detection sensors on vehicles and, more particularly, to a method for performing a virtual alignment of short range radar or other sensors onboard a vehicle which detects a misalignment condition of one or more sensors, determines a calibration angle adjustment for the sensors, and performs a virtual calibration of the sensors by adjusting the sensor readings in software, without having to physically adjust the sensors.

2. Discussion of the Related Art

Many modern vehicles include object detection sensors, which are used to enable collision warning or avoidance and other active safety applications. The object detection sensors may use any of a number of detection technologies—including short range radar, cameras with image processing, laser or LIDAR, and ultrasound, for example. The object detection sensors detect vehicles and other objects in the path of the host vehicle, and the application software uses the object detection information to issue warnings or take actions as appropriate.

In order for the application software to perform optimally, the object detection sensors must be aligned properly with the vehicle. For example, if a sensor detects an object that is actually in the path of the host vehicle but, due to sensor misalignment, the sensor determines that the object is slightly to the left of the path of the host vehicle, this can have significant consequences for the application software. Even if there are multiple forward-looking object detection sensors on a vehicle, it is important that they are all aligned properly, so as to minimize or eliminate conflicting sensor readings.

In many vehicles, the object detection sensors are integrated directly into the front fascia of the vehicle. This type of installation is simple, effective, and aesthetically pleasing, but it has the disadvantage that there is no practical way to physically adjust the alignment of the sensors. Thus, if a sensor becomes misaligned with the vehicle's true heading, due to damage to the fascia or age- and weather-related warping, there has traditionally been no way to correct the misalignment, other than to replace the entire fascia assembly containing the sensors.

SUMMARY OF THE INVENTION

In accordance with the teachings of the present invention, a method and tools are disclosed for virtually aligning object detection sensors on a vehicle without having to physically adjust the sensors. A sensor misalignment condition is detected during normal driving of a host vehicle by comparing different sensor readings to each other. At a vehicle service facility, the host vehicle is placed in an alignment fixture, and alignment of all object detection sensors is compared to ground truth to determine alignment calibration parameters. Alignment calibration can be further refined by driving the host vehicle in a controlled environment following a leading vehicle. Final alignment calibration parameters are authorized and stored in system memory, and applications which use object detection data henceforth adjust the sensor readings according to the calibration parameters.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an object detection sensor virtual alignment method is merely exemplary in nature, and is in no way intended to limit the invention or its applications or uses.

Object detection sensors have become commonplace in modern vehicles. Such sensors are used to detect objects which are in or near a vehicle's driving path, either forward or rearward. Many vehicles now integrate object detection sensors into exterior body trim panels in a way that precludes mechanical adjustment of the sensors. A method and tools are disclosed herein for calibrating sensor alignment in software, rather than mechanically adjusting the sensors.

Figure 1:
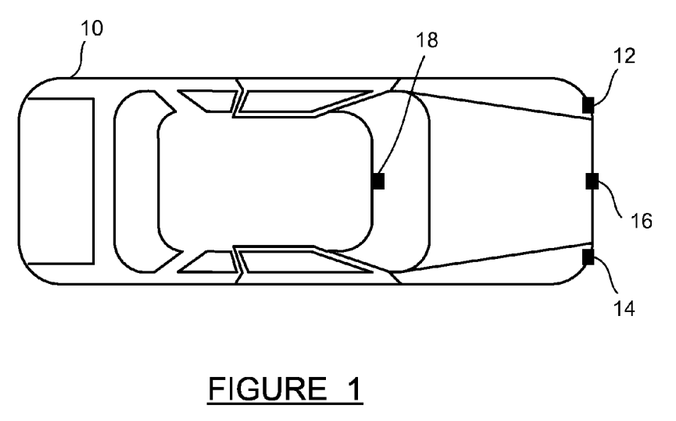
FIG. 1 is a top-view illustration of a vehicle, including several sensors which can be used for object detection.

FIG. 1 is a top-view illustration of a vehicle 10, including several sensors which can be used for object detection, lane keeping, and other active safety applications. The sensors include a left-side Short Range Radar, or SRR left 12, a right-side Short Range Radar, or SRR right 14, and a Long Range Radar (LRR) 16. The SRR left 12 and the SRR right 14 are commonly integrated into a bumper fascia on the front of the vehicle 10. The LRR 16 is typically mounted at the center of the front bumper, and may also be integrated into the bumper fascia. The vehicle 10 also includes a camera 18, which can be used in conjunction with the other sensors for object detection, as well as for other vision-based applications. The camera 18 is normally mounted inside the windshield of the vehicle 10, near the top center.

Figure 2:
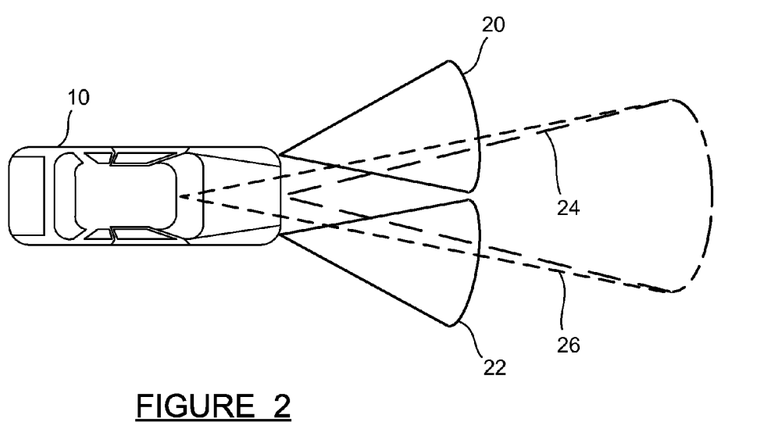
FIG. 2 is a top-view illustration of the vehicle shown in FIG. 1, showing exemplary coverage patterns for the object detection sensors.

FIG. 2 is a top-view illustration of the vehicle 10 showing exemplary coverage patterns for the SRR left 12, the SRR right 14, the LRR 16, and the camera 18. The coverage patterns indicate the effective field of view of each device, within which it can detect objects reliably. The SRR left 12 and the SRR right 14 have coverage patterns 20 and 22, respectively, which are biased to their respective sides of the vehicle 10, and which nearly touch or slightly overlap near the extended centerline of the vehicle 10. The coverage patterns 20 and 22 may extend about 30-40 meters in front of the vehicle, as an example. The LRR 16 has a coverage pattern 24 as shown, which may extend about 60 meters in front of the vehicle 10.

The LRR 16 may have two modes of operation, including the medium-range mode shown by the coverage pattern 24 in FIG. 2, and a long-range mode (not shown) which has a narrower coverage pattern and in which the object detection range is, for example, around 200 meters. The camera 18 has a field of view, or coverage pattern 26, of similar size and shape to the coverage pattern 24 of the LRR 16. Note that lengths of the coverage patterns 20-26 are not shown to scale relative to the vehicle 10 in FIG. 2.

The vehicle 10 may also include rear-facing object detection sensors (not shown), which may be a Short Range Radar, or vision-based, or may use some other technology. These are typically mounted in the rear bumper of the vehicle 10. Other technologies which may be used for the object detection sensors include ultrasound, and laser-based (including LIDAR). The virtual alignment methods disclosed herein can be applied to any of these object detection technologies.

As mentioned above, the SRR left 12 and the SRR right 14 are normally integrated into a front fascia of the vehicle 10. In most such installations, there is no practical way to physically adjust the orientation of the SRR left 12 or the SRR right 14 if they should become misaligned. Experience has shown that fascia-integrated sensors often do become misaligned over the course of time, due to either accident damage to the fascia, or to warping of the fascia associated with weathering. Significant misalignment of sensors integrated into a front fascia can adversely affect the performance of the object detection or other systems which use the sensor data. In a situation where the sensors have become significantly misaligned, there has traditionally been no alternative other than to replace the front fascia and sensor assembly. This replacement can be very expensive for the vehicle's owner.

The problem of fascia-integrated sensor misalignment can be overcome by performing a virtual alignment of the SRR left 12, the SRR right 14, and/or other sensors, in software. The virtual alignment, described below, eliminates the need to replace a deformed fascia.

Figure 3:
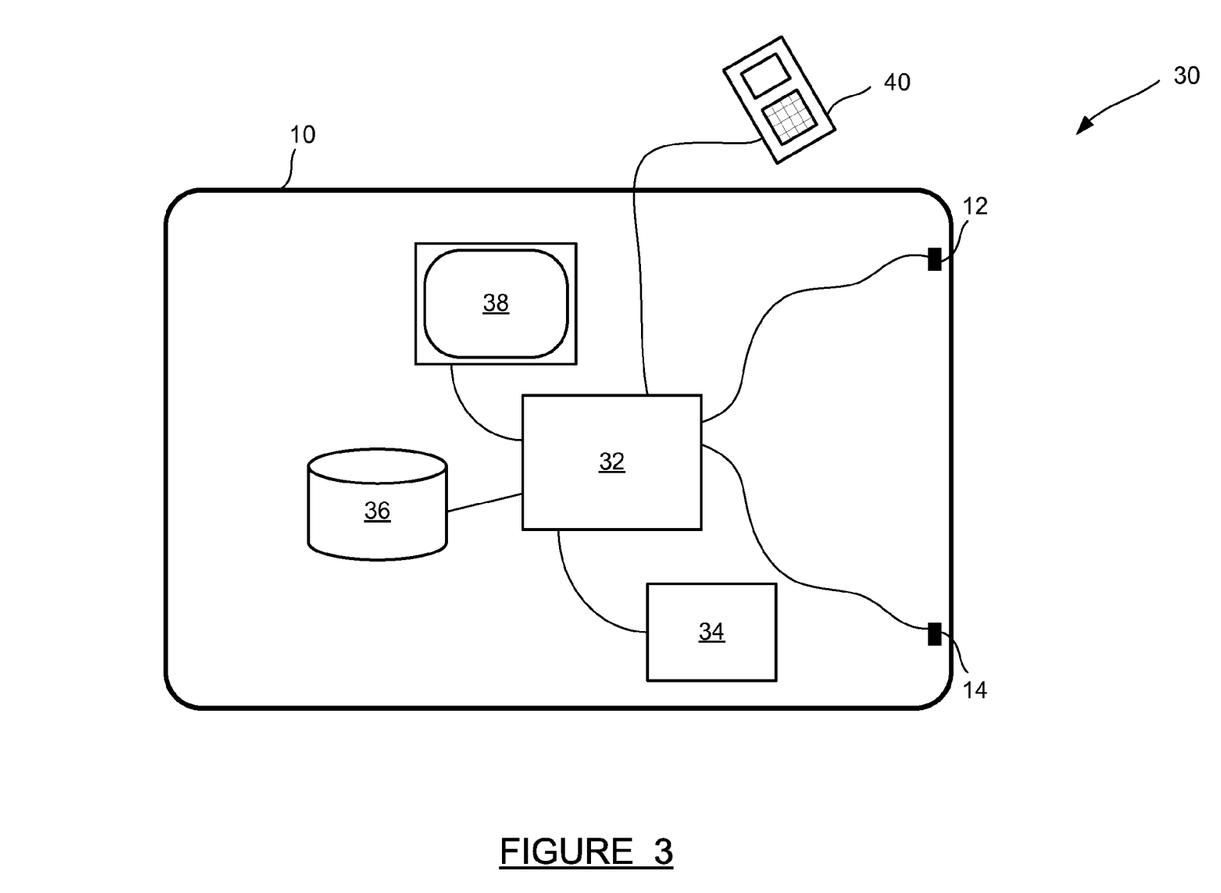
FIG. 3 is a schematic diagram of a system which allows virtual alignment of object detection sensors.

FIG. 3 is a schematic diagram of a system 30 which allows virtual alignment of object detection sensors. The vehicle 10 includes a controller 32, which receives data from the SRR left 12 and the SRR right 14. The controller 32 also manages the virtual alignment process to be described below. The controller 32 provides sensor data to an application module 34, which uses the sensor data for object detection or other purposes. The controller 32 also communicates with a memory module 36, which stores sensor-related parameters in non-volatile memory. If the controller 32 detects a sensor misalignment condition, as discussed below, a message can be provided to a driver of the vehicle 10 on a display 38. A technician tool 40 is connected to the vehicle 10 so as to communicate with the controller 32, and is used by a technician to perform a virtual sensor alignment and authorize storage of new alignment calibration parameters.

Figure 4:
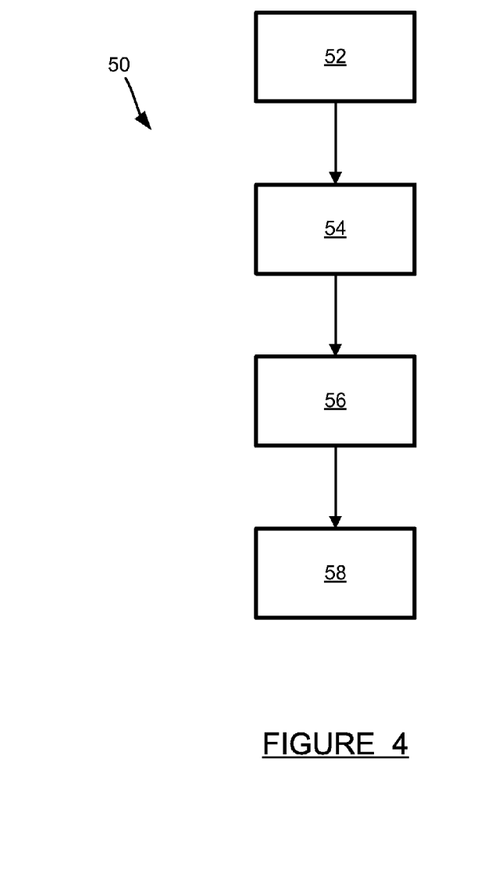
FIG. 4 is a flow chart diagram of a method for virtual alignment of object detection sensors.

FIG. 4 is a flow chart diagram 50 of a method for virtual alignment of object detection sensors, such as the SRR left 12 and the SRR right 14. At box 52, a misalignment larger than a certain threshold, such as 2 degrees, is detected during normal driving operation. When such a misalignment is detected at the box 52, the driver is alerted via a message on the display 38, and sensor alignment data is stored in the memory module 36. At box 54, sensor alignment is virtually adjusted using a target fixture with known ground truth. At box 56, sensor alignment is refined and validated in a controlled on-road driving test, using the data stored in the memory module 36. At box 58, refined alignment calibration values are authorized and stored in the memory module 36 for use by the controller 32 and the application module 34.

Figure 5:
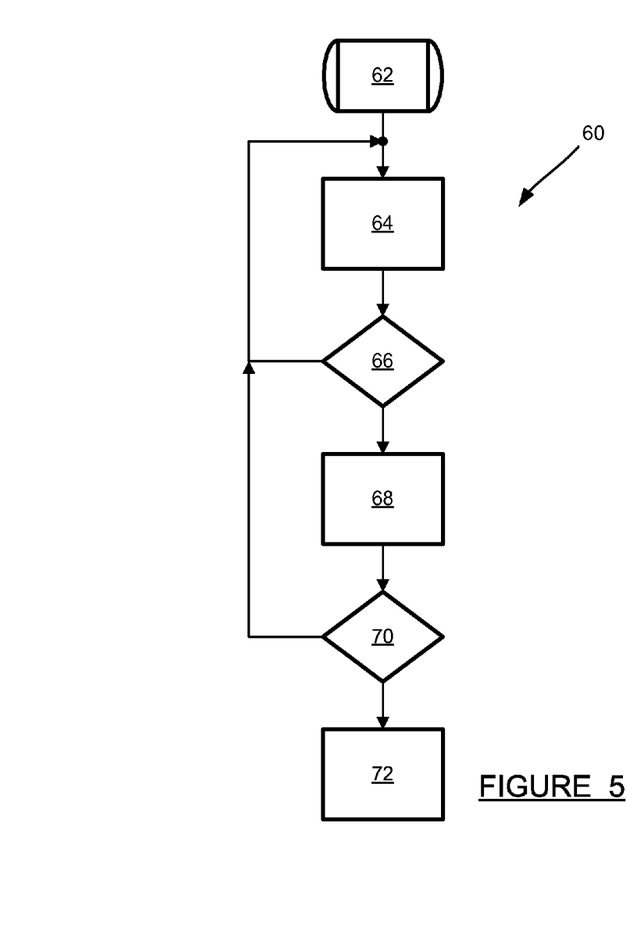
FIG. 5 is a flow chart diagram of a method for detecting sensor misalignment during normal driving operation.

FIG. 5 is a flow chart diagram 60 of a method for detecting sensor misalignment during normal driving operation, as performed at the box 52 of the flow chart diagram 50 described above. The vehicle begins driving at start box 62. At box 64, the driving environment is evaluated to determine if suitable conditions exist to check sensor alignment. In particular, at the box 64, it is determined if the vehicle 10 is driving on a straight road, and whether a close-range leading vehicle is present in the same lane as the vehicle 10. The evaluation of lane geometry, to determine if the vehicle 10 is driving straight, can be performed by analyzing vehicle lateral acceleration data, as most modern vehicles include onboard accelerometers. The lane geometry evaluation could also be performed via analysis of steering handwheel angle data, evaluation of lane boundary geometry from camera images, or by other means. The presence of a close leading vehicle is determined by forward-viewing sensors, such as the SRR left 12, the SRR right 14, the LRR 16, and/or the camera 18. The criteria for a close leading vehicle may be that a leading vehicle is present in the same lane as the vehicle 10, at a range of 20 to 40 meters, for example. At decision diamond 66, a determination is made as to whether the sensor alignment check can be performed. If the vehicle 10 is driving on a straight road and a close leading vehicle is present, the process moves to box 68. If both the straight road and leading vehicle conditions are not met, then the process loops back to re-evaluate the driving environment at the box 64.

At the box 68, sensor measurement residuals are computed from the measurements of the close leading vehicle. The residuals are computed at the box 68 by comparing sensor data from different sensors, such as the SRR left 12, the SRR right 14, the LRR 16, and even the camera 18. If the sensors directly indicate a target azimuth angle for the leading vehicle, then the azimuth angles can be compared. For example, if the SRR left 12 indicates a target azimuth angle of 3 degrees, but the other sensors all indicate a target azimuth angle of 0 degrees, then it can be determined that the SRR left 12 is misaligned by 3 degrees. If the sensors measure the range and lateral position, rather than the azimuth angle, of the leading vehicle, a misalignment angle can be computed. For example, if the sensors detect a close leading vehicle at a range of 20 meters, but the lateral position of the close leading vehicle—or a particular feature of the close leading vehicle—as indicated by the SRR left 12 is offset by 1 meter from the lateral position as indicated by the other sensors, then a misalignment or sensor measurement residual, $\delta_L$, of the SRR left 12 can be calculated as:

$$\delta_L = a \tan(\tfrac{1}{20}) \approx 3° \tag{1}$$

At decision diamond 70, the sensor measurement residuals from the box 68 are compared to a threshold value. For example, the threshold value may be designated by a vehicle manufacturer to be 2 degrees, meaning that action will be taken if any sensor is found to be more than 2 degrees out of alignment. If any sensor's residual is determined to exceed the threshold value, then at box 72 sensor misalignment is reported to the driver via a message on the display 38. Otherwise, the process loops back to re-evaluate the driving environment at the box 64. In the example described above, where the residual for the SRR left 12, $\delta_L$, is calculated to be about 3 degrees, sensor misalignment would be reported to the driver at the box 72, and misalignment data would be captured in the memory module 36.

In computing sensor measurement residuals at the box 68 and comparing the residuals to the threshold at the decision diamond 70, repeatability, or statistical significance, is required in order to make a decision. In other words, misalignment would not be reported at the box 72 based on just a single set of sensor readings. Rather, data may be evaluated over a rolling time window of several seconds, and misalignment reported only if one sensor is consistently misaligned from the others by an amount greater than the threshold value. It is noted that the methods described herein can be used to perform a virtual calibration of sensors which are physically misaligned by several degrees or more.

The misalignment detection activities described in the flow chart diagram 60 of FIG. 5 all take place at the box 52 of the flow chart diagram 50. As mentioned previously, at the box 54, sensor alignment is virtually adjusted using a target fixture with known ground truth. Although it is possible to envision a system in which sensor alignment calibration is performed continuously and automatically, with no user or technician intervention, it is proposed here that the virtual sensor alignment at the box 54 be performed by a service technician at a vehicle service facility. Thus, sometime after misalignment is detected and communicated to the driver at the box 52, the vehicle 10 would be taken to a service facility to have the sensors virtually aligned at the box 54.

Figure 6:
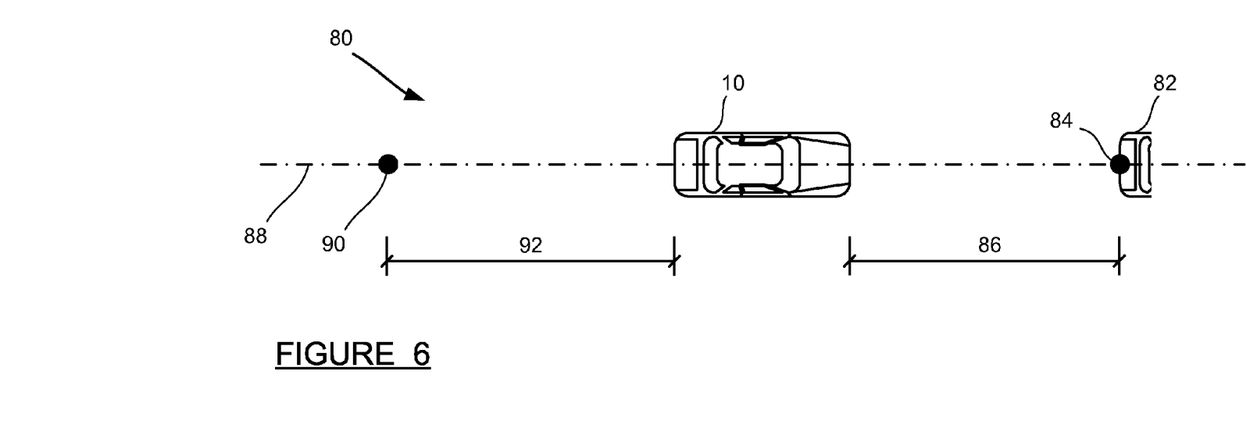
FIG. 6 is a top-view illustration of a target fixture which can be used for virtual sensor alignment.

FIG. 6 is a top-view illustration of a target fixture 80 which can be used for virtual sensor alignment. The vehicle 10 is placed in a known position in the target fixture 80. This could be accomplished by driving the tires of the vehicle 10 into a track, or by other means. A leading vehicle template 82 is positioned directly ahead of the vehicle 10. The leading vehicle template 82 could be a 3 dimensional model of the rear end of a vehicle, or it could simply be an image of the rear end of a vehicle on a flat board. In any case, the template 82 must appear as a leading vehicle to the sensors onboard the vehicle 10. A front target 84 is also included in the fixture 80. The front target 84 is a narrow object, such as a vertical metal pipe, which can enable the measurement of an azimuth angle of a specific object by the sensors onboard the vehicle 10. The leading vehicle template 82 and the front target 84 are positioned at a known distance 86 in front of the vehicle 10. The leading vehicle template 82 and the front target 84 should preferably be centered on extended centerline 88 of the vehicle 10, so that they represent a ground truth azimuth angle of 0 degrees. However, the template 82 and the target 84 could be positioned at a non-zero azimuth angle, as long as the angle is known.

A rear target 90 may also be included in the target fixture 80, for alignment of rear-facing sensors. The rear target 90 is envisioned as being a narrow object, such as a vertical metal pipe, similar to the front target 84. The rear target 90 is positioned at a known distance 92 behind the vehicle 10. All measurements in the target fixture 80 would be taken in a static condition.

Using the target fixture 80, the alignment of the sensors onboard the vehicle 10 can be checked at the box 54. This can be done by a service technician attaching the technician tool 40 to the vehicle 10, so that the tool 40 can communicate with the controller 32. The service technician would command the controller 32 to take readings from onboard sensors, such as the SRR left 12 and the SRR right 14. The onboard sensors would be detecting the leading vehicle template 82 and the front target 84, both of which are known to be positioned at a known azimuth angle (normally 0 degrees) relative to the vehicle 10. Any deviation in the readings from the onboard sensors, relative to ground truth, can be noted and stored in the memory module 36 as nominal alignment calibration values.

Figure 7:
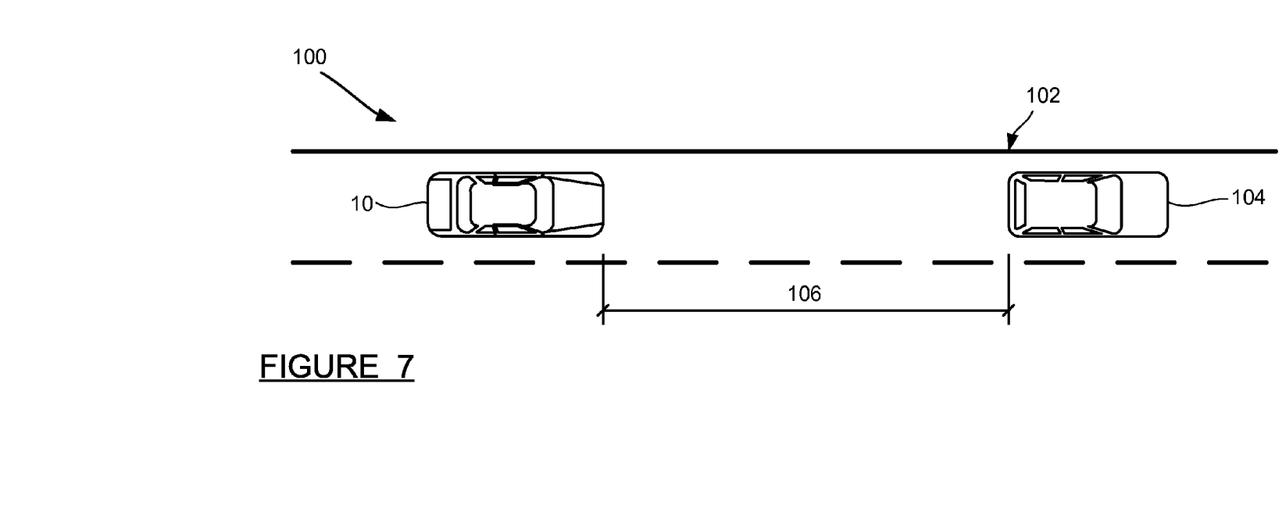
FIG. 7 is a top-view illustration of a test environment which can be used for sensor alignment refinement and validation.

At the box 56, sensor alignment can be refined and validated using a dynamic on-road test under controlled conditions. FIG. 7 is a top-view illustration of a test environment 100 which can be used for sensor alignment refinement and validation at the box 56. The vehicle 10 is driven on a roadway 102 behind a leading vehicle 104. In the test environment 100, the vehicle 10 is being driven by the service technician, and the technician tool 40 is still communicating with the controller 32. It is intended that the vehicle 10 follow the leading vehicle 104 by a fixed distance 106, and that the vehicle 10 and the leading vehicle 104 are in the same lane on a straight portion of the roadway 102.

As described previously, the validation at the box 56 in the test environment 100 would need to be performed over some time window, such as a few seconds, so that a statistical model could be applied to the sensor readings in order to determine refined alignment calibration values.

Figure 8:
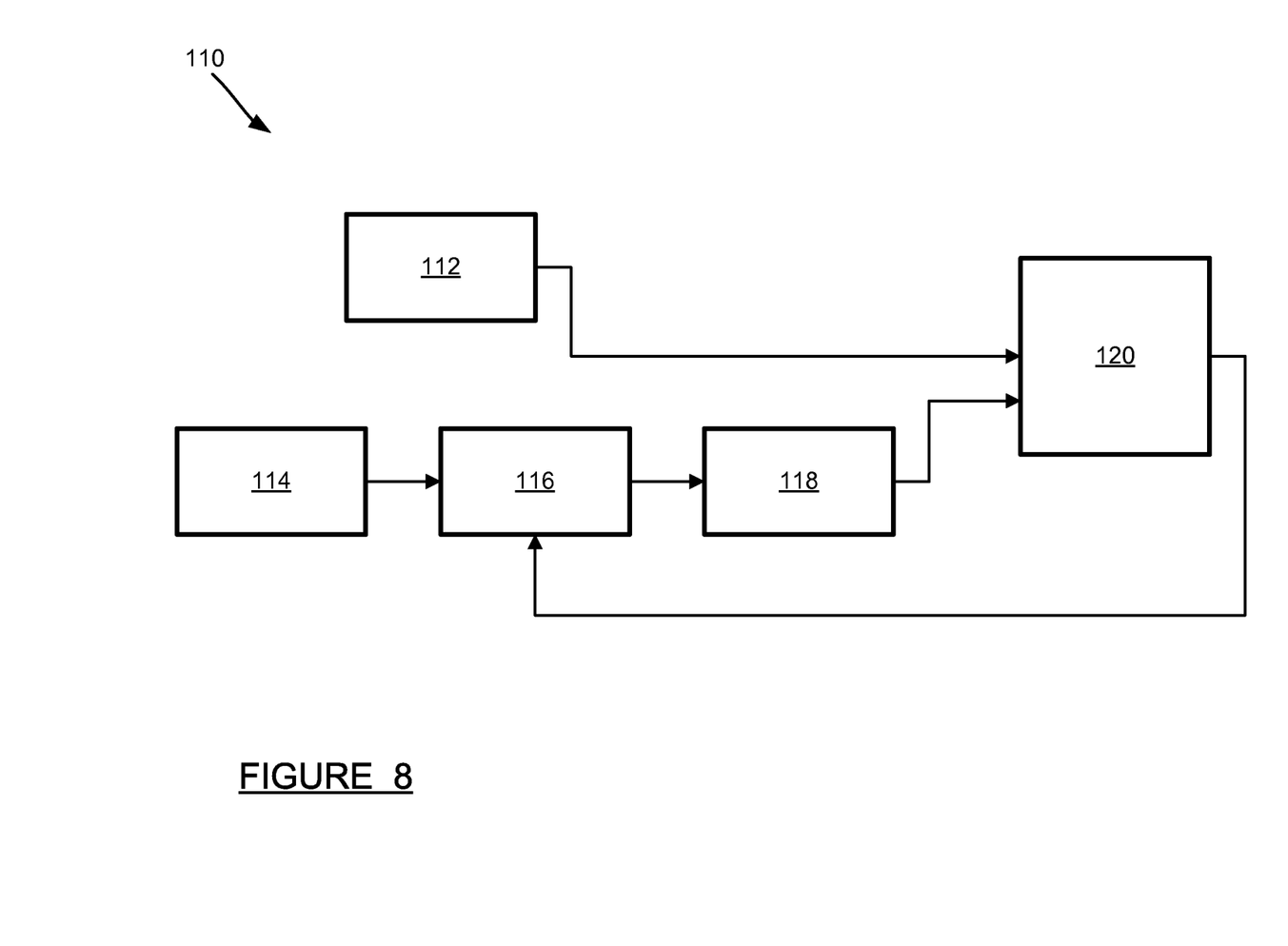
FIG. 8 is a flow chart diagram of a method for refining alignment calibration values.

FIG. 8 is a flow chart diagram 110 of a method for refining alignment calibration values at the box 56. At box 112, a ground truth azimuth angle value is determined for the leading vehicle 104 in the coordinate frame of the vehicle 10. Under ordinary conditions, the ground truth angle is 0 degrees. At box 114, sensor measurements are taken by, for example, the SRR left 12 and the SRR right 14. The measurements at the box 114 yield target azimuth angles to the leading vehicle 104. At box 116, sensor alignment calibration parameters are provided. Initial sensor alignment calibration parameters were determined and stored from the test on the target fixture 80 at the box 54. At box 118, the predicted target position is computed by adjusting the sensor readings from the box 114 with the calibration parameters from the box 116. At box 120, the predicted target position from the box 118 is compared to the ground truth value from the box 112, and any residual error is calculated. The residual error from the box 120 is fed back to adjust the sensor alignment calibration parameters at the box 116. The process shown on the flow chart diagram 110 can be continued, at the box 56 of the flow chart diagram 50, until the residual error is minimized.

The calculations at the box 56 can be performed as follows. Given a sensor data sequence, O={$o_t$|t=1, ..., T}, and an initial alignment calibration value, $a_0$, the calibration value can be refined using the sensor data. A target dynamic model can be defined as:

$$x_{t+1} = f(x_t) + v \qquad (2)$$

Where $x_t$ and $x_{t+1}$ are the position of the target, or the leading vehicle 104, at successive time steps, $f$ is the target model function, and v is a random noise variable which follows a Normal or Gaussian distribution with covariance matrix Q; that is, v~N(0,Q).

Similarly, a sensor observation model can be defined as:

$$o_t = h(x_t, a) + w \qquad (3)$$

Where $o_t$ is the sensor observation data which is modeled as a function of the target position $x_t$ and the alignment calibration value a, h is the observation model function, and w is a random noise variable which follows a Normal or Gaussian distribution with covariance matrix R; that is, w~N(0,R).

Using the target dynamic model of Equation (2) and the sensor observation model of Equation (3), a weighted least-squares calculation can be performed to find the target dynamic data sequence X={$x_t$|t=1, ..., T} and a refined alignment calibration value $a_1$. This is done by minimizing the function:

$$J = \sum_{t=1}^{T} \|h(x_t, a) - o_t\|_R^2 + \|f(x_t) - x_{t+1}\|_Q^2 \qquad (4)$$

Where J is the function to be minimized, a is the alignment calibration value being refined and adjusted to minimize J, and all other variables were defined previously.

The weighted least-squares calculation described above can be performed for each object detection sensor being calibrated. The output of the calculation is the refined alignment calibration value $a_1$.

At the box 58 of the flow chart diagram 50, a set of alignment calibration parameter values, computed as described above, are authorized for the vehicle 10 by the service technician. An alignment calibration parameter value is calculated and stored for each onboard sensor which requires virtual alignment. Using the technician tool 40, the service technician commands the controller 32 to store the refined alignment calibration values in the memory module 36. The refined alignment calibration values are used henceforth by the application module 34 to adjust readings from the SRR left 12, the SRR right 14, and/or the LRR 16, to account for any misalignment due to fascia damage or warping.

The virtual alignment method described herein provides a simple and effective way to correct the alignment of object detection sensors, including those which have no means of physical adjustment, thus improving the performance of applications which use the sensor data, and avoiding the expensive replacement of an otherwise usable fascia component.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for virtually aligning object detection sensors on a host vehicle, said method comprising:
   detecting a sensor misalignment condition during normal driving of the host vehicle, including determining that a set of prerequisite driving conditions exists, computing differences between readings from each of the object detection sensors, and determining if one or more of the object detection sensors is misaligned by an amount which exceeds a predefined threshold where the set of prerequisite driving conditions includes driving on a straight road, and a presence of a leading vehicle on the road ahead of the host vehicle;
   determining, by a microprocessor, alignment calibration parameters for the object detection sensors using an alignment target fixture with known ground truth, including placing the host vehicle at a known location in the alignment target fixture and statically measuring a position of one or more objects with each of the object detection sensors, where an actual position of the one or more objects relative to the host vehicle is known as established by the alignment target fixture;
   storing the alignment calibration parameters in memory; and
   using the alignment calibration parameters by an application program to adjust readings from the object detection sensors.

2. The method of claim 1 further comprising notifying a driver of the host vehicle of the misalignment condition.

3. The method of claim 1 wherein storing the alignment calibration parameters in memory includes attaching a technician tool to the host vehicle by a service technician, and using the technician tool to authorize the storage of the alignment calibration parameters in memory.

4. The method of claim 1 further comprising refining and validating the alignment calibration parameters by driving the host vehicle in a predetermined arrangement behind a leading vehicle.

5. The method of claim 4 wherein refining and validating the alignment calibration parameters includes driving the host vehicle behind the leading vehicle on a straight road, taking a sequence of sensor readings, and minimizing a mathematical function containing the sensor readings and the alignment calibration parameter which corresponds to the sensor readings.

6. The method of claim 1 wherein the object detection sensors include a left-side short-range radar, a right-side short range radar, and a long range radar.

7. The method of claim 1 wherein the application program is a collision detection alert or collision avoidance system.

8. A method for virtually aligning object detection sensors on a host vehicle, said object detection sensors including two short-range radar sensors and a long-range radar sensor, said method comprising:
   detecting a sensor misalignment condition during normal driving of the host vehicle;
   determining, by a microprocessor, alignment calibration parameters for the object detection sensors using an alignment target fixture with known ground truth, including placing the host vehicle at a known location in the alignment target fixture and statically measuring a position of one or more objects with each of the object detection sensors, where an actual position of the one or more objects relative to the host vehicle is known as established by the alignment target fixture;
   refining and validating the alignment calibration parameters by driving the host vehicle in a predetermined arrangement behind a leading vehicle;
   authorizing the storage of the alignment calibration parameters and storing the parameters in memory; and
   using the alignment calibration parameters by a collision detection alert or collision avoidance system to adjust readings from the object detection sensors.

9. The method of claim 8 wherein detecting a sensor misalignment condition includes determining that a set of prerequisite driving conditions exists, computing differences between readings from each of the object detection sensors, and determining if one or more of the object detection sensors is misaligned by an amount which exceeds a predefined threshold.

10. The method of claim 8 wherein refining and validating the alignment calibration parameters includes driving the host vehicle behind the leading vehicle on a straight road, taking a sequence of sensor readings, and minimizing a mathematical function containing the sensor readings and the alignment calibration parameter which corresponds to the sensor readings.

11. A virtual alignment system for object detection sensors on a host vehicle, said system comprising:
   a plurality of object detection sensors on the host vehicle, including a left-side short-range radar, a right-side short range radar, and a long range radar;
   an application program module which uses signals from the object detection sensors;
   a memory module for storing parameter data for the object detection sensors;
   a display unit for providing information to a driver of the host vehicle; a controller in communication with the object detection sensors, the application program module, the memory module, and the display unit, said controller being configured to determine alignment calibration parameters and adjust the signals from the object detection sensors using the alignment calibration parameters, where the controller is configured to determine alignment calibration parameters for the object detection sensors when the host vehicle is positioned at a known location in an alignment target fixture and a position of one or more objects is measured with each of the object detection sensors, and where an actual position of the one or more objects relative to the host vehicle is known as established by the alignment target fixture; and a technician tool adapted to communicate with the controller, said technician tool being used to authorize changes to the alignment calibration parameters.

12. The virtual alignment system of claim 11 wherein the application program module includes a collision detection alert or collision avoidance system.

13. The virtual alignment system of claim 11 wherein the controller is configured to detect a sensor misalignment condition during driving of the host vehicle under a set of prerequisite driving conditions.

14. The virtual alignment system of claim 11 wherein the controller is configured to refine and validate the alignment calibration parameters by driving the host vehicle behind a leading vehicle on a straight road, taking a sequence of sensor readings, and minimizing a mathematical function containing the sensor readings and the alignment calibration parameter which corresponds to the sensor readings.

15. A method for virtually aligning object detection sensors on a host vehicle, said method comprising:

detecting a sensor misalignment condition during normal driving of the host vehicle;

determining, by a microprocessor, alignment calibration parameters for the object detection sensors using an alignment target fixture with known ground truth, including placing the host vehicle at a known location in the alignment target fixture and statically measuring a position of one or more objects with each of the object detection sensors, where an actual position of the one or more objects relative to the host vehicle is known as established by the alignment target fixture;

refining and validating the alignment calibration parameters by driving the host vehicle in a predetermined arrangement behind a leading vehicle, including driving the host vehicle behind the leading vehicle on a straight road, taking a sequence of sensor readings, and minimizing a mathematical function containing the sensor readings and the alignment calibration parameter which corresponds to the sensor readings;

storing the alignment calibration parameters in memory; and using the alignment calibration parameters by an application program to adjust readings from the object detection sensors.

16. A virtual alignment system for object detection sensors on a host vehicle, said system comprising:

a plurality of object detection sensors on the host vehicle;

an application program module which uses signals from the object detection sensors;

a memory module for storing parameter data for the object detection sensors;

a display unit for providing information to a driver of the host vehicle;

a controller in communication with the object detection sensors, the application program module, the memory module, and the display unit, said controller being configured to determine alignment calibration parameters and adjust the signals from the object detection sensors using the alignment calibration parameters, where the controller is configured to determine alignment calibration parameters for the object detection sensors when the host vehicle is positioned at a known location in an alignment target fixture and a position of one or more objects is measured with each of the object detection sensors, and where an actual position of the one or more objects relative to the host vehicle is known as established by the alignment target fixture, and where the controller is also configured to refine and validate the alignment calibration parameters by driving the host vehicle behind a leading vehicle on a straight road, taking a sequence of sensor readings, and minimizing a mathematical function containing the sensor readings and the alignment calibration parameter which corresponds to the sensor readings; and a technician tool adapted to communicate with the controller, said technician tool being used to authorize changes to the alignment calibration parameters.

\* \* \* \* \*